Nov. 30, 1948.   A. MENNESSON   2,454,974
LIQUID DISTRIBUTING DEVICE
Filed March 1, 1945   3 Sheets-Sheet 1

INVENTOR
ANDRÉ MENNESSON
BY
ATTORNEY

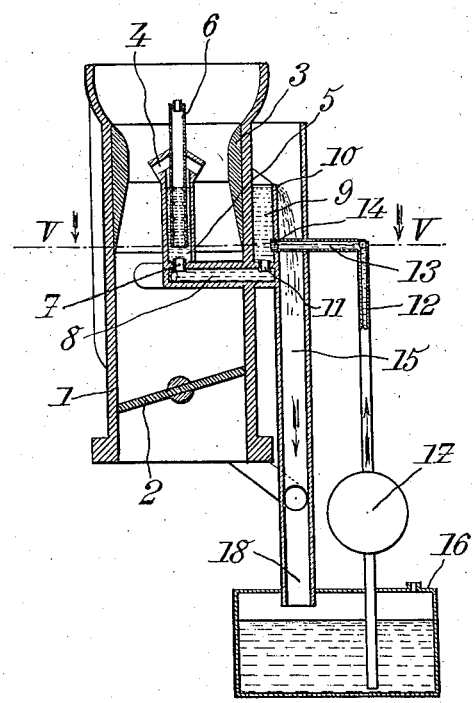
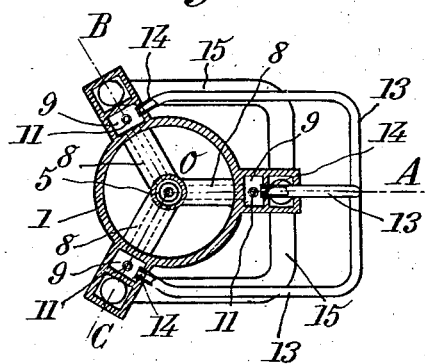

Nov. 30, 1948.  A. MENNESSON  2,454,974
LIQUID DISTRIBUTING DEVICE
Filed March 1, 1945                         3 Sheets-Sheet 3

INVENTOR
ANDRÉ MENNESSON
BY
ATTORNEY

Patented Nov. 30, 1948

2,454,974

UNITED STATES PATENT OFFICE 2,454,974

LIQUID DISTRIBUTING DEVICE

André Mennesson, Neuilly-sur-Seine, France, assignor to Société Anonyme Solex, Neuilly-sur-Seine (Seine), France, a society of the French Republic Application March 1, 1945, Serial No. 580,439
In France September 23, 1941

Section 1, Public Law 690, August 8, 1946
Patent expires September 23, 1961

10 Claims. (Cl. 261—36)

The present invention relates to devices of the kind of those intended to permit of distributing a liquid, at a level which is to remain always the same, to a chamber belonging to a system which is liable to undergo various inclinations. As an example of such systems, carburetors may be cited, and especially carburetors for the internal combustion engines of vehicles.

The chief object of the present invention is to provide a device of this kind which is better adapted to meet the requirements of practice than those used for the same purpose up to the present time, and, more particularly, a device of this kind which is both simpler and more accurate than the devices of similar purpose used up to now.

With this object in view, according to an essential feature of the present invention, the device includes, for the feed of a chamber under the conditions above set forth, means for supplying liquid to said chamber from at least two other chambers which are so devised that the liquid present therein is caused to remain substantially at a given level, owing to an overflow arrangement or through any other suitable means, these other chambers being disposed in such manner, in relation with the first mentioned chamber that the inclinations imparted to the whole system have for their effect that the pressure head of the liquid fed from one of the second mentioned chambers is increased whereas the head of the liquid fed from the other is reduced, and that these two effects balance each other under all circumstances.

This feature of the present invention is particularly interesting in its application to devices for feeding fuel to the chamber of a carburetor in which is to be produced the primary mixture of air and fuel.

In this application of the invention, the above stated feature consists in providing the second mentioned chambers, which are for instance two in number, symmetrically with respect to the chamber in which the primary mixture is to be produced, said two chambers being of the overflow type, and in connecting together these overflow chambers through suitable conduits, together with means for accurately determining the rate of flow of fuel, said means consisting for instance of a calibrated orifice or several calibrated orifices preferably disposed along the axes of said overflow chambers and which preferably have the same characteristics of flow.

According to another feature of the present invention, which relates to devices for feeding liquid to at least two distinct chambers, such for instance as the overflow chambers above referred to, from a single feed apparatus, I make use of means, such as suitably calibrated orifices, for distributing to said chambers the liquid discharged from said apparatus, and ensuring a correct feed to said chambers whatever be the inclination of the whole system to which they belong.

Other features of the present invention will result from the following detailed description of some specific embodiments thereof.

Preferred embodiments of the present invention will be hereinafter described, with reference to the accompanying drawings, given merely by way of example, and in which:

Fig. 4 is a view, similar to Fig. 1, of a second embodiment of the invention;

Fig. 5 is a horizontal sectional view on the line V—V of Fig. 4;

Figure 1:
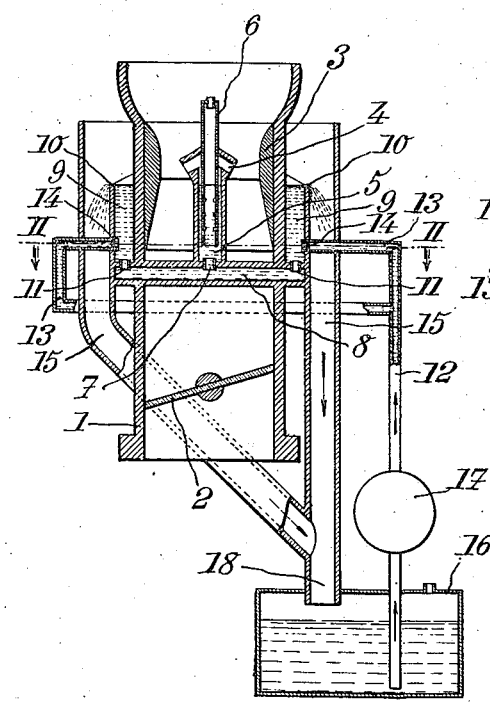
Fig. 1 is a vertical sectional view, partly in elevation, of a carburetor provided with a device, made according to the present invention, for keeping a constant level of liquid in the chamber where the primary mixture of air and fuel is to be formed.

The invention is supposed to be applied to a carburetor for the internal combustion engine of a land, sea, or air vehicle liable to undergo various and relatively considerable inclinations.

This carburetor includes, in the usual way, means for the atomizing of the fuel and means for forming a primary mixture of said fuel with air. These means may be of any suitable conventional type, such for instance as illustrated by the drawings. In this contruction, I make use of a body 1 provided with a throttle valve for controlling the flow of carburetted mixture to the engine. The main jet system includes a chamber 5 intended to be filled with fuel up to a certain level and with a tube 6, in communication with the incoming air stream, partly immersed in the fuel present at the bottom of chamber 5, said tube 6 being provided with a certain number of holes of suitable size.

If chamber 5 is suitably fed with fuel, this arrangement ensures the formation of the primary mixture of air and fuel, owing to the small holes provided in tube 6 and to the action of the suction existing at the outlet of one or several orifices 4, said orifices being preferably located at the level of the restricted portion of choke tube 3.

Concerning now the means for feeding fuel to chamber 5, it is known that, according to the usual constructions, they include a constant level chamber provided with a float and a needle valve. Such devices do not permit of keeping the level of fuel in a fixed position in chamber 5 when the machine driven by the internal combustion engine is liable to take variable inclinations. As a consequence of this disturbances in the working of the engine are experienced, due to the fact that the atomizing holes of tube 6 themselves work under conditions which vary with the circumstances.

The means for feeding fuel to chamber 5 are therefore devised, according to the present invention, in such manner that the level can remain constant in chamber 5 or the like, which necessitates, in particular, a constant static head of the liquid at the inlet of said chamber 5.

For this purpose, according to the invention, the feed of fuel liquid to chamber 5 is ensured from two other chambers (or more than two other chambers) in which the liquid is caused to remain substantially at a given level, said other chambers being disposed in such manner, with relation to chamber 5, that the inclinations imparted to the whole result, on the one hand, in an increase of the static head of the liquid fed from one or several of said other chambers, and, on the other hand, in a decrease of the liquid head in the other or others, these two effects resulting in the maintaining of a constant liquid head at the lower end of the atomizing chamber 5.

For this purpose, it will be readily understood that it will be possible to proceed in many different ways.

Concerning first the general arrangement of said chambers, the number of which may be two (as in the embodiment of Figs. 1 to 3), three (as in the embodiment of Figs. 4 and 5) or even more, it is of interest to dispose them in a symmetrical manner with respect to the axis of chamber 5, said axis coinciding, in the embodiments shown by the drawings, with the axis of the jet. In this case, said chambers are in communication with the bottom of chamber 5, in which the primary mixture of air and fuel is to be formed, through conduits and calibrated orifices which preferably have all the same characteristics when said chambers are similar to one another.

Concerning now the means for keeping the liquid columns at substantially constant heights in said last mentioned chambers (said respective heights being all equal when the whole system is symmetrical), it is advantageous to apply the means for ensuring a constant level of liquid by overflow as described, in particular in the French Patent No. 635,497, filed December 28, 1927, by "Société Anonyme Solex."

In this case it is necessary to ensure that, through suitable feeding means, preferably a single feed apparatus, such as pump or the like, the liquid may be distributed to the various chambers in question, whereby said liquid is constantly fed up to the top part of each of said chambers, whatever be the inclination of the whole. In order to obtain this result, I make use, for instance, either of other calibrated orifices, or of suitably loaded spring valves, interposed across the path of travel of the liquid. But it must be well understood that these examples do not exclude other possible means of obtaining the same result.

The excess of fuel which overflows is then returned to the fuel tank of any other device, advantageously through a single conduit.

Figure 3:
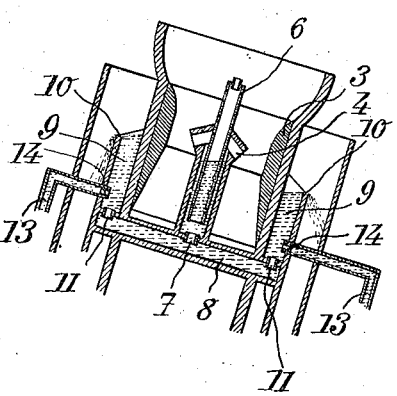
Fig. 3 is a partial view of the apparatus of Fig. 1, shown in a different working position.
Figure 2:
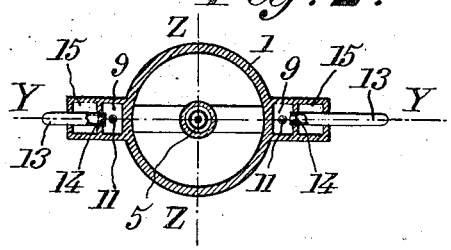
Fig. 2 is a sectional view on the line II—II of Fig. 1.

I will now proceed to describe in detail, by way of example, the apparatus illustrated by Figs. 1 to 3, which corresponds to the case of two overflow chambers.

These chambers 9 are for instance made of prismatic or cylindrical shape, and they are both of the same size. The axes of these prismatic chambers are disposed at equal distances, respectively, from the axis of the carburetor jet. The whole is designed in such manner than, when the vehicle is resting upon a horizontal surface, the upper edges 10 of said chambers, over which the liquid is to flow, are located in the same horizontal plane, which is to coincide with the liquid level in the central chamber 5 where the primary mixture is to be formed.

Chambers 9 are in communication with chamber 5 through suitable conduits 8, and I interpose, across the path of travel of the liquid, the calibrated orifices above referred to. For instance, as shown by the drawing, I interpose such a calibrated orifice, designated by reference character 11, at the bottom of each of the overflow chambers 9, and still another calibrated orifice, designated by reference numeral 7, at the bottom of the central chamber 5 and also along the axis thereof.

I make use, for feeding fuel to the overflow chambers 9, of an apparatus such as a pump 17, which discharges the liquid, from a fuel tank 16, toward said chambers 9 through conduits 12, 13. It is necessary to prevent, when the two chambers 9 are at different levels, the liquid from being fed to the chamber at the lower level at the cost of the feed to the other chamber. For this purpose, I provide, in conduits 12 and 13, for instance at the outlets thereof, calibrated orifices 14. But of course, any other means might be used for obtaining the same result.

Finally, in order to return to fuel tank 16 the liquid escaping by overflow from chambers 9, I make use, for instance, of conduits 15, connected together at the bottom, at 18.

The apparatus above described will work in the following manner:

In the normal position, which is that shown by Fig. 1, the level in chamber 5 is determined by the height of overflow chambers 9, that is to say the level of their edges 10. The rate of flow of the liquid is then determined by the system of calibrated orifices 7 and 11. But it should be well understood that calibrated orifice 7 might be dispensed with, in which case the rate of flow would be determined merely by orifices 11.

If it be supposed that the whole of the apparatus is inclined, so as to take, for instance, the position shown by Fig. 3, about an axis such as the axis z—z of Fig. 2, the two overflow edges 10 of the respective chambers are now located at different levels, respectively. A simple calculation will show that the total head of liquid at the outlet of the central orifice 7 remains unchanged. In other words, the upper level of the liquid column in chamber 5 is located midway between the levels of the overflow edges 10 if both orifices 11 have the same characteristics. Consequently, the liquid level in chamber 5 remains unchanged.

Of course, this result can be obtained only if both of the overflow chambers 9 are always full of liquid. But it has been stated above that the whole of pump 17, conduits 12 and 13 and calibrated orifices 14 has been especially devised in order to comply with this condition.

On the other hand, it will be seen that if the apparatus is inclined about an axis such as Y—Y (Fig. 2), at right angles to axis Z—Z, the feed conditions are not modified.

Consequently, the feeding means according to the present invention, and in particular the means just above described with reference to the drawing, have for their effect to keep the liquid level constant in the chamber where the primary mixture of fuel and air is to be produced, whatever be the inclination of the machine.

In Figs. 4 and 5, I have shown a carburetor provided with three overflow chambers 9 of the same kind as those just above described, said chambers 9 being, in this second embodiment of the invention, disposed at 120° from one another, along axes OA, OB, OC, respectively. In these figures the same reference characters are used for designating the same elements as in Figs. 1 to 3.

This apparatus works in the same manner as the apparatus of Figs. 1 to 3. In this case also, the control of the flow of fuel to chamber 5 could be ensured with only three orifices 11, and orifice 7 could be dispensed with.

It will be readily understood that I can, in a likewise manner, make carburetors including a multiplicity of overflow chambers distributed in a uniform manner about the axis of central chamber 5, these overflow chambers communicating with the central chamber through calibrated orifices 11 having the same characteristics.

Figure 6:
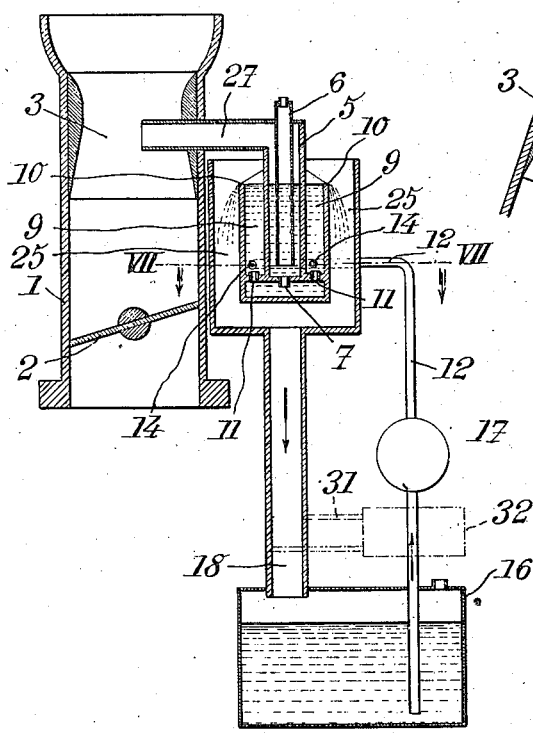
Fig. 6 is a view, similar to Figs. 1 and 4, of a third embodiment of the invention.
Figure 8:
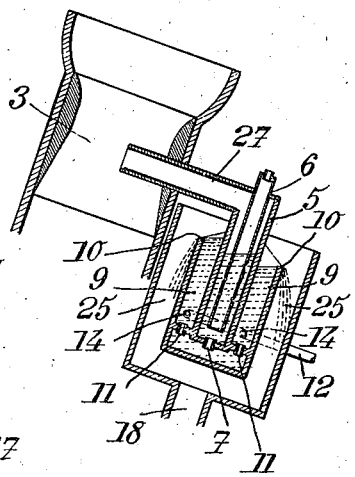
Fig. 8 is a partial view of the carburetor of Fig. 6, shown in an inclined position.
Figure 7:
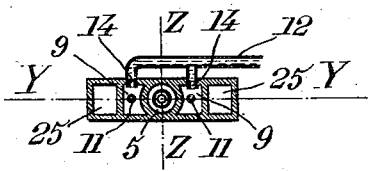
Fig. 7 is a horizontal sectional view, on the line VII—VII of Fig. 6.

In Figs. 6 to 8, inclusive, I have shown still another embodiment of my invention, in which the chamber in which the primary mixture of air and fuel is formed and the fuel is atomized is located outside of the body of the carburetor and is connected to the restricted portion of the choke tube thereof through a conduit 27.

In this case also the same reference characters designate the same parts as in the embodiment of Figs. 1 to 3.

The central chamber 5 in which the primary carburetted mixture is formed, is provided, on either side thereof, with overflow chambers 9. The liquid that flows over the edges 10 of these chambers passes into the outer chambers 25 from which it is returned to the fuel tank, through conduit 18.

Eventually, instead of having a conduit 18 which opens directly into fuel tank 16, I might have this conduit feeding a device 32, interposed between the feed apparatus 17 and said fuel tank, this device 32 being similar to that described in the French Patent No. 758,197, filed January 11, 1934, by "Société Anonyme Solex."

Whatever be the particular embodiment that is chosen, the operation of the device according to the present invention results sufficiently clearly from the preceding description for making it unnecessary to enter into further explanations.

This device has, over devices used for similar purposes up to the present time many advantages. In particular, the device according to the present invention can work under conditions which are always identical, whatever be the inclination of the system, and this result is obtained through the simplest means.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. A device for maintaining a constant level of liquid in a chamber having a normally vertical axis irrespective of different inclinations thereof, which comprises, in combination with said chamber, at least two other chambers distributed at regular intervals and at the same distance around said axis and fixed with respect thereto, means for constantly feeding liquid to each of said second mentioned chambers, said second mentioned chambers having respective overflow edges all located in a plane at right angles to said axis, passages for connecting said second mentioned chambers with the inlet of said first mentioned chamber, said passages including calibrated orifices for controlling the rate of flow of liquid therethrough, said calibrated orifices having the same dimensions respectively so that the variations of the respective heads of liquid, on the inlet of the first mentioned chamber resulting from varying inclinations of the whole, compensate one another, so as to give a constant resultant head of liquid on said inlet.

2. A device according to claim 1 in which the inlet of the first mentioned chamber is located in the bottom and on the axis thereof.

3. A carburetor for the internal combustion engine of a machine liable to undergo variable inclinations which comprises, in combination, a choke tube, a chamber, having a normally vertical axis, for forming an atomized mixture of air and fuel, in communication with said choke tube, at least two other chambers having normally vertical axes regularly distributed about said first mentioned chamber, at the same distance therefrom and in fixed relation therewith, a fuel tank, means for constantly feeding fuel from said tank to each of said second mentioned chambers, said second mentioned chambers having respectively overflow edges located in a common plane at right angles to said first mentioned axis, a passage for connecting each of said second mentioned chambers with the inlet of said first mentioned chamber, each of said passages including a calibrated orifice for controlling the rate of flow of liquid therethrough, said calibrated orifices being all of the same diameter and being all at the same distance from said last mentioned axis, so that the variations of the respective static heads of liquid on the inlet of the first mentioned chamber, resulting from varying inclinations of the whole, compensate one another so as to give a constant resultant static head of liquid on said inlet, and means for returning to said tank the excess of fuel flowing over said overflow edges.

4. A carburetor according to claim 3 in which the inlet of said first mentioned chamber is located in the bottom and on the axis thereof.

5. A carburetor for the internal combustion engine of a machine liable to undergo variable inclinations which comprises, in combination, a choke tube, a chamber, having a normally vertical axis, for forming an atomized mixture of air and fuel, in communication with said choke tube, two other chambers having normally vertical axes symmetrical to each other about the axis of said first mentioned chamber and in fixed relation therewith, a fuel tank, means for constantly feeding fuel from said tank to each of said second mentioned chambers, said second mentioned chambers having each an overflow edge for controlling the liquid level therein, a passage for connecting each of said second mentioned chambers with the inlet of said first mentioned chamber, each of said passages including a calibrated orifice for controlling the rate of flow of liquid therethrough, said calibrated orifices being both of the same diameter and the two overflow edges of said second mentioned chambers respectively being located in the same plane perpendicular to the axis of the first mentioned chamber and at the same distance therefrom, so that the variations of the respective static heads of liquid on the inlet of the first mentioned chamber resulting from varying inclinations of the whole compensate one another so as to give a constant resultant static head of liquid on said inlet, and means for returning to said tank the excess of fuel flowing over said overflow edges.

6. A carburetor according to claim 3 in which the first mentioned chamber is located laterally and outside of said choke-tube and in communication therewith.

7. A carburetor according to claim 3 and including a single device for constantly feeding, from said fuel tank, each of said second mentioned chambers.

8. A carburetor according to claim 3 and including a single pump for constantly feeding, from said fuel tank, each of said second mentioned chambers, passages connecting said pump to each of said chambers and a calibrated orifice in each of said passages.

9. A carburetor according to claim 3 and including a single pump for constantly feeding, from said fuel tank, each of said second mentioned chambers, passages connecting said pump to each of said chambers and a calibrated orifice in each of said passages, and a conduit for returning to said tank the excess of fuel admitted in said second mentioned chambers and flowing over their overflow edges.

10. A carburetor according to claim 3 and including a single pump for constantly feeding each of said second mentioned chambers, a conduit connecting said fuel tank to the input of said pump, passages connecting the output of said pump to each of said second mentioned chamber, a calibrated orifice in each of said passages, and a device, adapted to feed said pump conduit for returning the excess of fuel admitted into said second mentioned chambers and flowing over their overflow edges to said device, said excess of fuel being thus circulated outside of the fuel tank.

ANDRÉ MENNESSON.

REFERENCES CITED

The following references are of record in the file of this patent:

UNITED STATES PATENTS

| Number | Name | Date |
|---|---|---|
| 936,337 | Maybach | Oct. 12, 1909 |
| 1,933,360 | Barbarou | Oct. 31, 1933 |
| 2,063,107 | Mock | Dec. 8, 1936 |

FOREIGN PATENTS

| Number | Country | Date |
|---|---|---|
| 481,179 | France | Aug. 14, 1916 |
| 644,866 | France | Oct. 16, 1928 |
| 767,341 | France | July 16, 1934 |